US012721302B1

(12) United States Patent
Anderson et al.

(10) Patent No.: US 12,721,302 B1
(45) Date of Patent: Sep. 1, 2026

(54) PROTECTIVE PET BLANKET

(71) Applicant: Pet Parents LLC, Ankeny, IA (US)

(72) Inventors: Blake Anderson, Ankeny, IA (US); Mikaela Stanley, Ankeny, IA (US)

(73) Assignee: Pet Parents, LLC, Ankeny, IA (US)

( * ) Notice: Subject to any disclaimer, the term of this patent is extended or adjusted under 35 U.S.C. 154(b) by 639 days.

(21) Appl. No.: 17/443,368

(22) Filed: Jul. 26, 2021

Related U.S. Application Data

(60) Provisional application No. 63/056,045, filed on Jul. 24, 2020.

(51) Int. Cl.
*A01K 1/015* (2006.01)
*A01K 1/01* (2006.01)
*B32B 7/12* (2006.01)

(52) U.S. Cl.
CPC .......... *A01K 1/0157* (2013.01); *A01K 1/0107* (2013.01); *B32B 7/12* (2013.01); *B32B 2307/7265* (2013.01); *B32B 2307/73* (2013.01); *B32B 2307/732* (2013.01)

(58) Field of Classification Search
CPC ...... A01K 1/0107; A01K 1/0157; B32B 7/12; B32B 2307/7265; B32B 2307/73; B32B 2307/732
See application file for complete search history.

(56) References Cited

U.S. PATENT DOCUMENTS 4,813,944 A * 3/1989 Haney ................. A61F 13/5323 5/484
6,381,779 B1 5/2002 Thompson
9,943,451 B2 4/2018 Komatsubara et al.
10,568,299 B2 2/2020 Miller
2002/0164465 A1* 11/2002 Curro .................. A61K 8/0208 442/361

(Continued)

FOREIGN PATENT DOCUMENTS

AU 2011101252 10/2011
CA 2683993 C * 1/2011 ....... A61F 13/15699

(Continued)

OTHER PUBLICATIONS

Machine Translation of JP 2000-350744A (Year: 2000).*
Machine Translation of JP 2014-233410A (Year: 2014).*
Machine Translation of KR 2014-084104 A (Year: 2014).*

*Primary Examiner* — Sathavaram I Reddy
(74) *Attorney, Agent, or Firm* — Robinson IP Law, PLLC

(57) ABSTRACT

A blanket includes: a first layer having an outer surface and an inner surface opposite thereof, the first layer being substantially wicking such that moisture is transferred from the outer surface of the first layer towards the inner surface thereof, the outer surface of the first layer forming a first side of the blanket; a second layer having an outer surface and an inner surface opposite thereof, the second layer being substantially wicking such that moisture is transferred from the outer surface of the first layer towards the inner surface thereof, the outer surface of the second layer forming a second side of the blanket; and a barrier layer located between the first layer and the second layer, the barrier located adjacent to and between the inner surface of the first layer and the inner layer of the second layer, wherein the barrier layer substantially prevents moisture from passing therethrough.

15 Claims, 3 Drawing Sheets

(56) References Cited

U.S. PATENT DOCUMENTS

| | | | | |
|---|---|---|---|---|
| 2005/0118383 | A1* | 6/2005 | Cargill | A61F 7/02 428/36.1 |
| 2009/0044756 | A1* | 2/2009 | Otsuji | A01K 1/0157 119/169 |
| 2011/0201243 | A1* | 8/2011 | Miele | C03C 25/255 442/331 |
| 2012/0260422 | A1* | 10/2012 | Rock | A47G 9/0223 5/483 |
| 2015/0047571 | A1 | 2/2015 | Mast | |
| 2016/0286754 | A1 | 10/2016 | Miller | |
| 2017/0280671 | A1 | 10/2017 | Miller | |
| 2021/0100300 | A1* | 4/2021 | Turner | B32B 5/06 |

FOREIGN PATENT DOCUMENTS

| | | | | | |
|---|---|---|---|---|---|
| GB | 2323811 | | | 5/2000 | |
| GB | 2360436 | | | 3/2002 | |
| JP | 2000350744 | A | * | 12/2000 | |
| JP | 2014233410 | A | * | 12/2014 | |
| KR | 2014084104 | A | * | 7/2014 | A61F 13/515 |
| WO | WO2001056372 | | | 8/2001 | |
| WO | WO2013163669 | | | 11/2013 | |
| WO | WO-2022076377 | A1 | * | 4/2022 | B32B 3/04 |

* cited by examiner

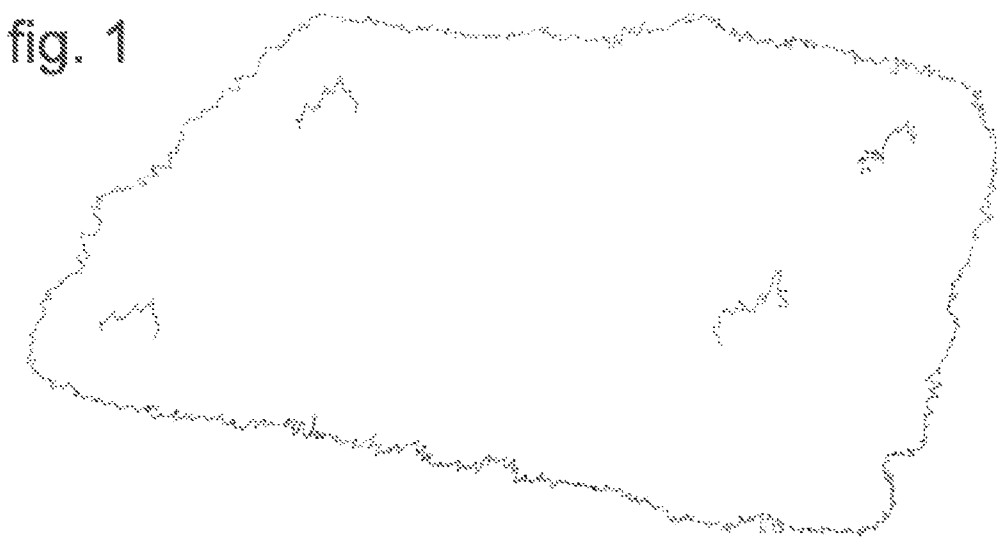
fig. 1
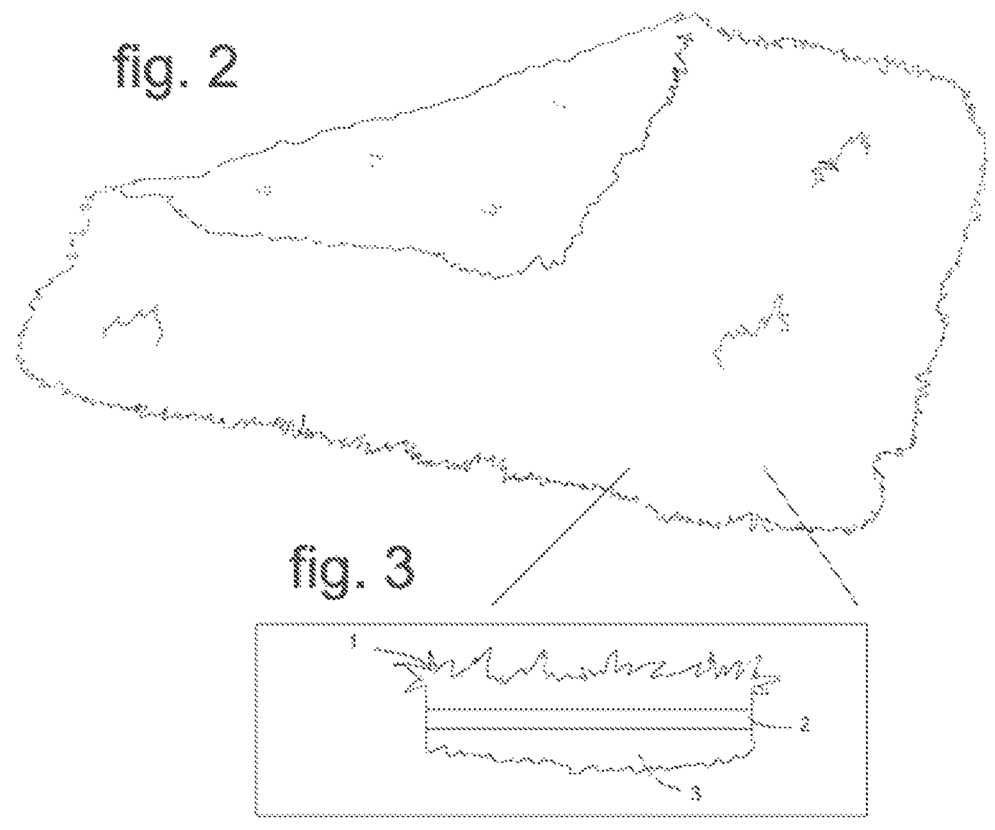
fig. 2
fig. 3
1
2
3

PROTECTIVE PET BLANKET

CROSS-REFERENCE TO RELATED APPLICATION(S)

This application claims priority to and is a non provisional of U.S. Provisional patent Application Ser. No. 63/056,045 for a "Protective Blanket" filed on Jul. 24, 2020, the contents of which are incorporated herein by reference in its entirety.

FIELD

This disclosure relates to the field of pet products. More particularly, this disclosure relates to an absorbent blanket that prevents liquids from seeping through.

BACKGROUND

When house training a pet, it may be necessary to clean up after the pet such as if the pet has an accident within a house. Further, it may be desired to protect certain areas where the pet may rest, such as on furniture or in a crate of the pet. Typical blankets do not include moisture wicking properties that help to wick away and hold moisture. Further, many existing blankets and similar products are not waterproof, thereby allowing a surface under the blanket to become wet.

What is needed, therefore, is a moisture wicking pet blanket that is further waterproof to protect a surface underneath the blanket.

SUMMARY

The above and other needs are met by a blanket that is moisture wicking and waterproof to protect a surface underneath the blanket. In a first aspect, a blanket includes: a first layer having an outer surface and an inner surface opposite thereof, the first layer being substantially wicking such that moisture is transferred from the outer surface of the first layer towards the inner surface thereof, the outer surface of the first layer forming a first side of the blanket; a second layer having an outer surface and an inner surface opposite thereof, the second layer being substantially wicking such that moisture is transferred from the outer surface of the first layer towards the inner surface thereof, the outer surface of the second layer forming a second side of the blanket; and a barrier layer located between the first layer and the second layer, wherein the barrier is located adjacent to and between the inner surface of the first layer and the inner layer of the second layer, wherein the barrier layer substantially prevents moisture from passing therethrough.

In one embodiment, the barrier layer includes a substantially impermeable backing formed on at least one of the first layer and the second layer. In another embodiment, the barrier layer includes a hydrophobic treatment applied to one or more of the inner surface of the first layer and the inner surface of the second layer.

In yet another embodiment, the first layer and the second layer are joined with a binding material located around at least a portion of outer edges of the first layer and the second layer. In one embodiment, the first layer and the second layer are joined with an adhesive.

In another embodiment, the first layer has a thickness that is greater than a thickness of the second layer. In yet another embodiment, the first layer has a thickness of from about 12 mm to about 22 mm. In one embodiment, the second layer has a thickness of from about 5 mm to about 15 mm.

In another embodiment, the blanket includes: a first inner layer located between the first layer and the barrier; and a second inner layer located between the second layer and the barrier. In yet another embodiment, the first inner layer and the second inner layer are moisture wicking such that the first inner layer draws moisture towards the barrier from the first layer and such that the second inner layer draws moisture towards the barrier from the second layer.

In one embodiment, the first inner layer and the second inner layer are formed of a fine synthetic fiber. In another embodiment, the barrier is formed of one of a treatment or backing located on an inner surface of one or more of the first inner layer and the second inner layer. In yet another embodiment, the barrier is formed of a hydrophobic coating applied to at least a portion of one or both of the first inner layer and the second inner layer.

In a second aspect, a blanket includes: a first layer having an outer surface and an inner surface opposite thereof, the first layer being substantially wicking such that moisture is transferred from the outer surface of the first layer towards the inner surface thereof, the outer surface of the first layer forming a first side of the blanket; a first inner layer located adjacent to the first layer, the first inner layer located against the first layer such that the first inner layer wicks moisture from the first layer into the first inner layer; a second layer having an outer surface and an inner surface opposite thereof, the second layer being substantially wicking such that moisture is transferred from the outer surface of the first layer towards the inner surface thereof, the outer surface of the second layer forming a second side of the blanket; a second inner layer located adjacent to the second layer, the second inner layer located against the second layer such that the second inner layer wicks moisture from the second layer into the second inner layer; and a barrier layer located between the first inner layer and the second inner layer, wherein the barrier is located adjacent to and between the inner surface of the first layer and the inner layer of the second layer, wherein the barrier layer substantially prevents moisture from passing therethrough.

In one embodiment, the barrier layer includes a substantially impermeable backing formed on at least one of the first inner layer and the second inner layer. In another embodiment, the barrier layer includes a hydrophobic treatment applied to a portion of one or more of first inner layer and the second inner layer.

In yet another embodiment, the first layer, the first inner layer, the second layer, and the second inner layer are joined with a binding material located around at least a portion of outer edges of one or more of the first layer, the first inner layer, the second layer, and the second inner layer.

In one embodiment, the first inner layer and the second inner layer are formed of a fine synthetic fiber.

In another embodiment, the first layer has a thickness that is greater than a thickness of the second layer.

In a third aspect, a blanket includes: a first layer having an outer surface and an inner surface opposite thereof, the first layer being substantially wicking such that moisture is transferred from the outer surface of the first layer towards the inner surface thereof, the outer surface of the first layer forming a first side of the blanket; a first inner layer located adjacent to the first layer, the first inner layer located against the first layer such that the first inner layer wicks moisture from the first layer into the first inner layer; a second layer having an outer surface and an inner surface opposite thereof, the second layer being substantially wicking such that moisture is transferred from the outer surface of the first layer towards the inner surface thereof, the outer surface of the second layer forming a second side of the blanket; a second inner layer located adjacent to the second layer, the second inner layer located against the second layer such that the second inner layer wicks moisture from the second layer into the second inner layer; and a barrier layer located between the first inner layer and the second inner layer, wherein the barrier is selected from the group consisting of a backing formed on one or more of the first inner layer and the second inner layer and a hydrophobic treatment applied to a portion of one or more of first inner layer and the second inner layer, wherein the barrier layer substantially prevents moisture from passing therethrough.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 1 shows a perspective view of a protective pet blanket according to one embodiment of the present disclosure;

FIG. 2 shows a perspective view of a protective pet blanket with a corner folded up showing an opposite side of the protective pet blanket;

FIG. 3 shows a cross-sectional side view showing layers of a protective pet blanket.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

FIG. 1 shows a basic embodiment of a protective pet blanket. The protective pet blanket is preferably adapted to be moisture wicking such that any fluids are absorbed and retained by the protective pet blanket. The protective pet blanket is further adapted to be waterproof such that any fluids absorbed by the protective pet blanket do not pass completely through the protective pet blanket, such as to an opposite side of the blanket, thereby protecting a surface underneath the protective pet blanket.

In one embodiment, the protective pet blanket includes a first layer 1 as shown in FIG. 3. The first layer 1 is preferably formed of a fabric material having a first thickness. The first layer 1 is preferably treated or formed to transfer moisture away from an outer surface of the first layer 1. For example, the first layer 1 may be hydrophilic, such as treated with a hydrophilic treatment, such that the first layer is wicking and absorbs any moisture or fluids that contact the first layer 1, thereby drawing any moisture or fluids into the protective pet blanket.

In one exemplary and non-limiting embodiment, the first layer 1 is formed of a blend of acrylic, modacrylic, or polyester fibers. The first layer may, for example, have a thickness of from about 12 mm to about 22 mm, although various other thicknesses of the first layer may be suitable. In one example, the first layer is treated with two treatments or coatings to transfer water or moisture away from an outer-facing surface on an exterior of the blanket.

The protective pet blanket further includes a second layer 3 that is located adjacent to the first layer 1. The second layer 3 is formed of a fabric material having a second thickness. The second layer 3 is preferably treated or formed to transfer moisture away from an outer surface of the second layer 3. For example, the second layer 3 may be hydrophilic, such as treated with a hydrophilic treatment, such that the second layer is wicking and absorbs any moisture or fluids that contact the second layer thereby drawing any moisture or fluids into the protective pet blanket.

In one exemplary and non-limiting embodiment, the second layer 3 is formed of a blend of polyester acrylic yarn. The first layer may, for example, have a thickness of from about 5 mm to about 15 mm, although various other thicknesses of the first layer may be suitable. In one example, the first layer is treated with two treatments or coatings to transfer water or moisture away from an outer-facing surface on an exterior of the blanket.

Figure 6:
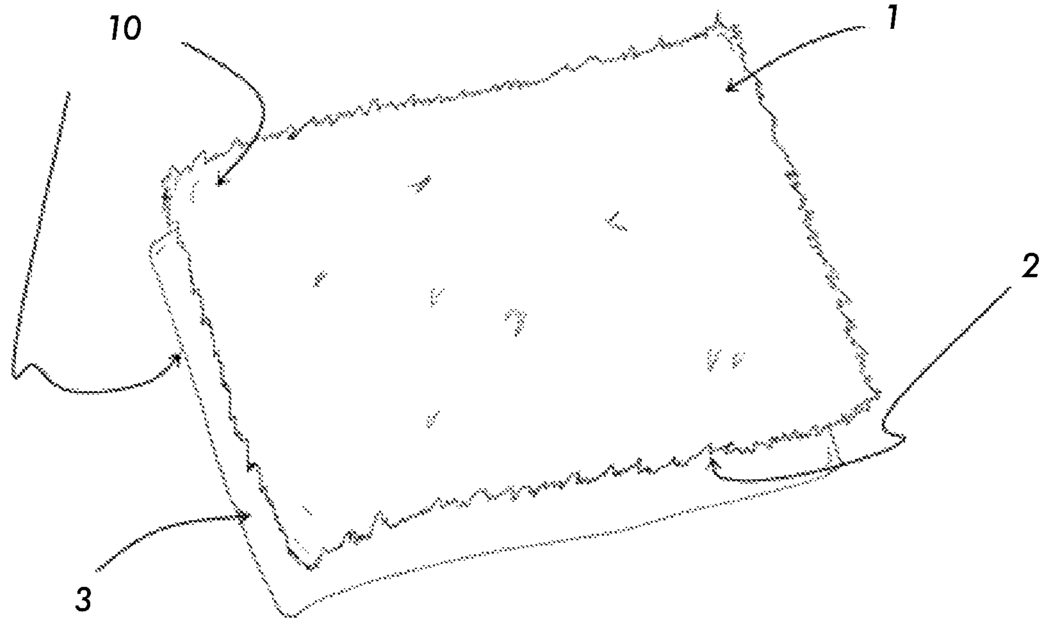
FIG. 6 shows an exploded view of a protective pet blanket including absorbent layers according to one embodiment of the present disclosure.

Referring to FIGS. 3 and 6, the protective pet blanket further includes a barrier 2 formed between the first layer and the second layer. The barrier may be, for example, a hydrophobic or water impermeable layer or backing formed on one of the first layer and the second layer. For example, in one embodiment the barrier 2 may be a treatment applied to a back of one or both of the first layer and the second layer. The barrier 2 is preferably located between inner surfaces of the first layer and the second layer to substantially prevent moisture absorbed by one or both of the first layer and the second layer from passing through the blanket and into the other of the first layer and second layer.

For example, the barrier 2 may comprise a coating (such as a TPU coating) applied to a backing or inner portion of one of the first layer and the second layer. Alternatively, the barrier 2 may be formed by applying a hydrophobic coating or treatment 10 to an inner portion of one or both of the first layer and the second layer. For example, a hydrophobic coating or treatment may be applied to at least a portion of one or both of the first layer and the second layer at less than a full depth of the first and second layer such that a portion of the first layer and the second layer is substantially impermeable by fluids.

The first layer 1, second layer 3, and barrier are preferably arranged as shown in FIG. 3 wherein the first layer 1 and the second layer 3 are located adjacent to one another. In one embodiment, the first thickness of the first layer 1 and the third thickness of the second layer 3 may be substantially the same. In another embodiment, one of the first layer 1 and the second layer 3 may have a thickness that is greater or less than a thickness of the other of the first layer 1 and the second layer 3. In one embodiment, the first layer and the second layer 3 are formed of substantially the same material. In yet another embodiment, a material of the first layer 1 may be different from a material of the second layer 3 such that opposing sides of the protective pet blanket have differing textures or different moisture wicking properties.

The first layer 1, second layer 3, and barrier therebetween are preferably joined to one another such that the barrier is positioned between the first layer and the second layer. The first layer and second layer may be joined, such as with stitching located around edges of the first layer 1, second layer 2, and barrier therebetween. The first layer 1 and second layer may otherwise be bonded to one another using other known methods of bonding fabrics to one another. For example, in one embodiment a binding material is located around one or more edges of the protective pet blanket to substantially secure the first layer 1 and the second layer 2 to one another.

The arrangement of layers of the protective pet blanket advantageously enables the protective pet blanket to wick moisture away from a pet and towards the waterproof center of the protective pet blanket. The substantially waterproof barrier or hydrophobic inner portion of the blanket prevents moisture from passing through the protective pet blanket and to the other side, such as into an opposing layer or surface on which the protective pet blanket is resting.

Figure 4:
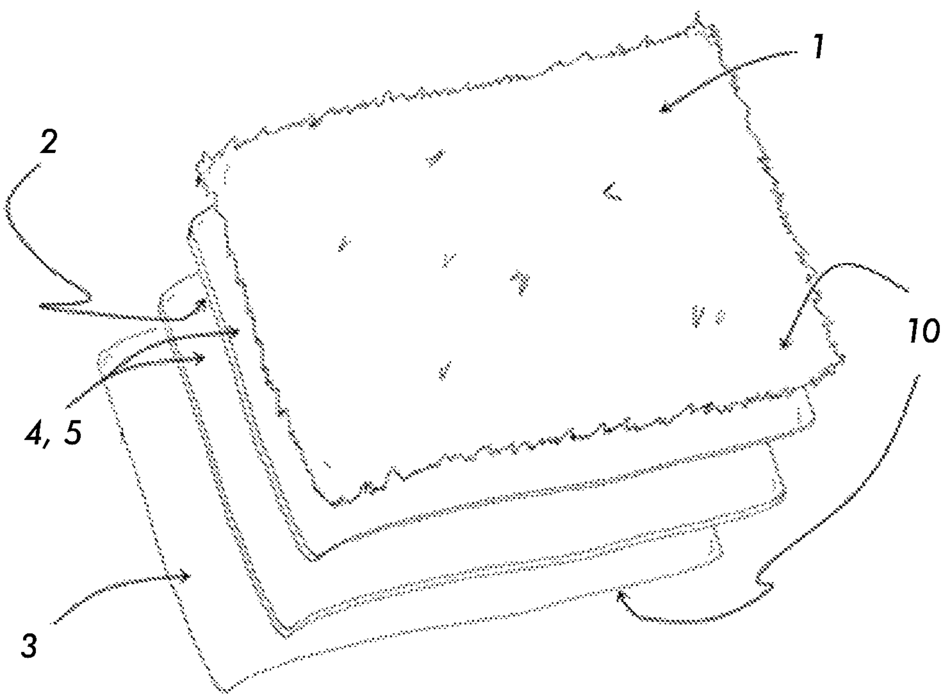
FIG. 4 shows an exploded view of a protective pet blanket including additional absorbent layers according to one embodiment of the present disclosure.
Figure 5:
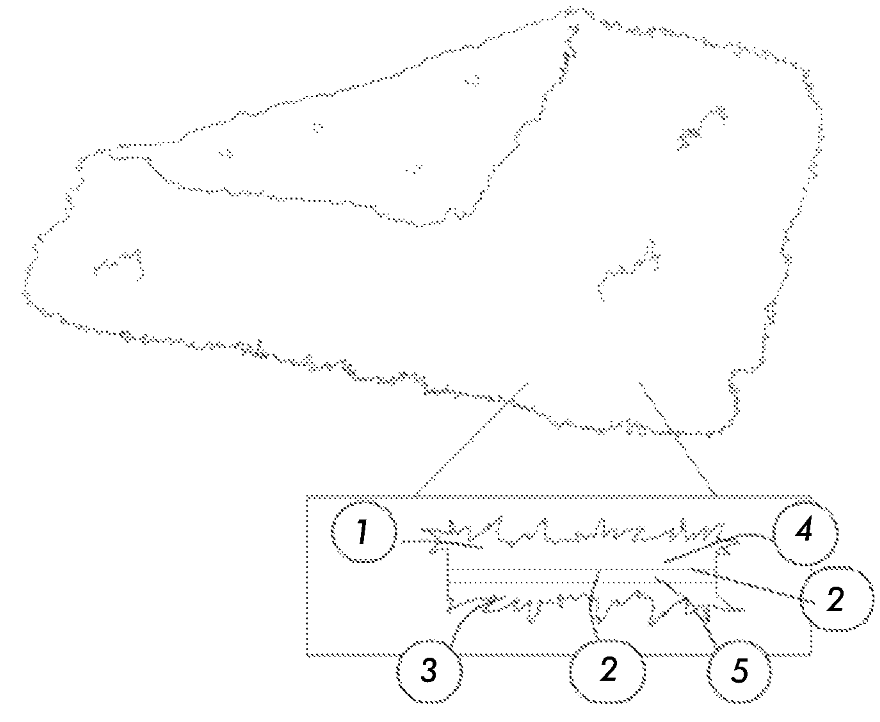
FIG. 5 shows a cross-sectional side view of a protective pet blanket including additional absorbent layers according to one embodiment of the present disclosure.

In another embodiment, the protective pet blanket further includes additional layers to further enhance moisture absorbing capabilities of the protective pet blanket while further prevent moisture or fluids from passing through the blanket. Referring to FIGS. 4 and 5, the protective pet blanket further includes additional layers located between the first layer 1 and the second layer 3. For example, in one embodiment the protective pet blanket further includes a first inner layer 4 located between the first layer 1 and the barrier 2. The protective pet blanket may further include a second inner layer 5 located between the second layer 3 and the barrier 2.

The first inner layer 4 and the second inner layer 5 may be formed, for example, of a fine synthetic fiber such as a microfiber material for further providing absorption of fluids into the pet protective blanket. The barrier 2 is preferably formed by applying a hydrophobic or waterproof coating or treatment to an inner side of one or both of the first inner layer 4 and the second inner layer 5 such that fluid or moisture is not able to pass from the first inner layer 4 to the second inner layer 5 or vice versa.

By including the first inner layer 4 and the second inner layer 4 as shown in FIGS. 4 and 5, the protective pet blanket is further capable of absorbing liquid or moisture into layers of the blanket while prevent liquid or moisture passing through the blanket. For example, if fluid or moisture is absorbed into the first layer 1, the hydrophilic or properties of the first layer 1 further absorb the moisture or fluid into the blanket and further into the first inner layer 4. The first inner layer 4, which preferably further includes hydrophilic properties on a side of the first inner layer 4 that is adjacent to the first layer 1, further absorbs the moisture or fluid into the blanket. The moisture or fluid is prevented from passing through the blanket, such as from the first inner layer 4 to the second inner layer 5 by the barrier 2.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A blanket comprising:

a first layer having an outer surface and an inner surface opposite thereof, the first layer formed of a wicking fabric material such that moisture is transferred from the outer surface of the first layer towards the inner surface thereof, the outer surface of the first layer forming a first side of the blanket;

a second layer having an outer surface and an inner surface opposite thereof, the second layer formed of a wicking fabric material such that moisture is transferred from the outer surface of the second layer towards the inner surface thereof, the outer surface of the second layer forming a second side of the blanket that is opposite of the first side of the blanket;

a barrier layer located between the first layer and the second layer, wherein the barrier layer is located adjacent to and between the inner surface of the first layer and the inner surface of the second layer, wherein the barrier layer prevents moisture from passing therethrough, wherein the barrier layer comprises a hydrophobic coating or impermeable backing coupled to the first layer or to the second layer.

2. The blanket of claim 1, wherein the barrier layer further comprises a hydrophobic treatment applied to one or more of the inner surface of the first layer and the inner surface of the second layer.

3. The blanket of claim 1, wherein the first layer and the second layer are joined with a binding material located around at least a portion of outer edges of the first layer and the second layer.

4. The blanket of claim 1, wherein the first layer and the second layer are joined with an adhesive.

5. The blanket of claim 1, wherein the first layer has a thickness that is greater than a thickness of the second layer.

6. The blanket of claim 5, wherein the first layer has a thickness of from about 12 mm to about 22 mm.

7. The blanket of claim 5, wherein the second layer has a thickness of from about 5 mm to about 15 mm.

8. The blanket of claim 1, further comprising:

a first inner layer located between the first layer and the barrier layer; and a second inner layer located between the second layer and the barrier layer.

9. The blanket of claim 8, wherein the first inner layer and the second inner layer are moisture wicking such that the first inner layer draws moisture towards the barrier layer from the first layer and such that the second inner layer draws moisture towards the barrier layer from the second layer.

10. The blanket of claim 8, wherein the first inner layer and the second inner layer are formed of a synthetic microfiber.

11. A blanket comprising:

a first layer having an outer surface and an inner surface opposite thereof, the first layer formed of a wicking fabric material such that moisture is transferred from the outer surface of the first layer towards the inner surface thereof, the outer surface of the first layer forming a first side of the blanket;

a first inner layer located adjacent to the first layer, the first inner layer located against the first layer such that the first inner layer wicks moisture from the first layer into the first inner layer;

a second layer having an outer surface and an inner surface opposite thereof, the second layer formed of a wicking fabric material such that moisture is transferred from the outer surface of the first layer towards the inner surface thereof, the outer surface of the second layer forming a second side of the blanket that is opposite of the first side of the blanket;

a second inner layer located adjacent to the second layer, the second inner layer located against the second layer such that the second inner layer wicks moisture from the second layer into the second inner layer;

a barrier layer located between the first inner layer and the second inner layer, wherein the barrier layer is located adjacent to and between the inner surface of the first layer and the inner surface of the second layer, wherein the barrier layer prevents moisture from passing therethrough, wherein the barrier layer comprises a hydrophobic coating or impermeable backing coupled to the first inner layer or to the second inner layer.

12. The blanket of claim 11, wherein the barrier layer further comprises a hydrophobic treatment applied to a portion of one or more of first inner layer and the second inner layer.

13. The blanket of claim 11, wherein the first layer, the first inner layer, the second layer, and the second inner layer are joined with a binding material located around at least a portion of outer edges of one or more of the first layer, the first inner layer, the second layer, and the second inner layer.

14. The blanket of claim 11, wherein the first inner layer and the second inner layer are formed of a synthetic microfiber.

15. The blanket of claim 11, wherein the first layer has a thickness that is greater than a thickness of the second layer.

* * * * *